United States Patent
Wolfe et al.

(10) Patent No.: US 9,922,368 B2
(45) Date of Patent: Mar. 20, 2018

(54) SYSTEM AND METHOD FOR PURCHASING A PREPAID DEBIT ACCOUNT

(71) Applicant: GiftCodes.com, LLC, Pittsburgh, PA (US)

(72) Inventors: Jason Wolfe, Sewickley, PA (US); Shawn D. Allen, Gibsonia, PA (US)

(73) Assignee: GIFTCODES.COM, LLC, Pittsburgh, PA (US)

(*) Notice: Subject to any disclaimer, the term of this patent is extended or adjusted under 35 U.S.C. 154(b) by 0 days.

(21) Appl. No.: 15/138,342

(22) Filed: Apr. 26, 2016

(65) Prior Publication Data

US 2016/0239909 A1 Aug. 18, 2016

Related U.S. Application Data

(63) Continuation of application No. 14/275,948, filed on May 13, 2014, now Pat. No. 9,324,110, which is a (Continued)

(51) Int. Cl.
*G06Q 40/00* (2012.01)
*G06Q 30/08* (2012.01)
(Continued)

(52) U.S. Cl.
CPC ............ *G06Q 30/08* (2013.01); *G06Q 20/06* (2013.01); *G06Q 20/28* (2013.01); *G06Q 20/342* (2013.01);
(Continued)

(58) Field of Classification Search
CPC .... G06Q 30/08; G06Q 10/02; G06Q 30/0601; G06Q 40/00; G06Q 30/06; G06Q 30/0283; G06Q 50/188
(Continued)

(56) References Cited

U.S. PATENT DOCUMENTS

| 4,809,837 A | 3/1989 | Hayashi |
| 5,960,411 A | 9/1999 | Hartman |

(Continued)

FOREIGN PATENT DOCUMENTS

WO WO 2008/013945 1/2008

OTHER PUBLICATIONS

Swapagift.com Expands its "Cash for Your Card" program. Retrieved from http://www.prweb.com/releases/2003/12/prweb96305.htm on Nov. 9, 2011.
(Continued)

*Primary Examiner* — Jamara Franklin

(57) ABSTRACT

Disclosed herein are systems, methods, and non-transitory computer-readable storage media for auctioning gift cards on the secondary market. The system can receive a prepaid debit account for resale from an owner and determine a face value for the prepaid debit account. The system can establish a floor price and offer the prepaid debit account for sale via an auction, starting at an initial price above the floor price and up to and including the face value, and can decrement the sale price at regular time intervals. The system can end the auction when a purchaser purchases the prepaid debit account at the decremented price. However, if no purchaser purchases the prepaid debit account before the decremented price is below the floor price, the system can purchase the prepaid debit account from the owner for the floor price. The system can store the prepaid debit account in an inventory for resale.

18 Claims, 7 Drawing Sheets

Related U.S. Application Data continuation-in-part of application No. 13/934,631, filed on Jul. 3, 2013, now Pat. No. 9,336,524, which is a continuation-in-part of application No. 12/701,711, filed on Feb. 8, 2010, now Pat. No. 8,500,007, which is a continuation-in-part of application No. 12/573,060, filed on Oct. 2, 2009, now Pat. No. 8,887,998.

(51) Int. Cl.
*G06Q 40/04* (2012.01)
*G06Q 20/28* (2012.01)
*G06Q 20/34* (2012.01)
*G07F 17/42* (2006.01)
*G06Q 20/06* (2012.01)
*G06Q 20/38* (2012.01)
*G06Q 20/40* (2012.01)
*G06Q 30/02* (2012.01)

(52) U.S. Cl.
CPC ....... *G06Q 20/387* (2013.01); *G06Q 20/4016* (2013.01); *G06Q 30/02* (2013.01); *G06Q 30/0201* (2013.01); *G06Q 30/0207* (2013.01); *G06Q 40/04* (2013.01); *G07F 17/42* (2013.01)

(58) Field of Classification Search
USPC ..... 705/37, 5, 26.3, 26.1, 35, 1.1, 39, 14.23, 705/80, 26.4, 14.51, 44; 235/379, 380
See application file for complete search history.

(56) References Cited

U.S. PATENT DOCUMENTS

| | | | |
|---|---|---|---|
| 7,424,452 B2 | 9/2008 | Feilbogen et al. | |
| 7,494,048 B2 | 2/2009 | Gusler et al. | |
| 7,527,192 B1 | 5/2009 | Chaskin et al. | |
| 7,624,921 B1 | 12/2009 | Beck et al. | |
| 7,941,344 B1* | 5/2011 | Bickerstaff | G06Q 30/00 |
| | | | 705/14.35 |
| 8,152,060 B2 | 4/2012 | Wolfe et al. | |
| 8,152,061 B2 | 4/2012 | Wolfe et al. | |
| 8,229,851 B2 | 7/2012 | Doran et al. | |
| 8,285,643 B2 | 10/2012 | Isaacson et al. | |
| 8,401,957 B2 | 3/2013 | Forlai | |
| 8,463,661 B2 | 6/2013 | Blair et al. | |
| 8,528,814 B2 | 9/2013 | Wolfe | |
| 8,733,637 B1 | 5/2014 | Cedeno | |
| 9,016,567 B2 | 4/2015 | Wolfe | |
| 9,547,856 B2 | 1/2017 | Wolfe | |
| 9,679,277 B2 | 6/2017 | Wolfe | |
| 2001/0007098 A1 | 7/2001 | Hinrichs et al. | |
| 2002/0046255 A1 | 4/2002 | Moore et al. | |
| 2002/0065713 A1 | 5/2002 | Awada et al. | |
| 2003/0004828 A1 | 1/2003 | Epstein | |
| 2004/0078325 A1 | 4/2004 | O'Connor | |
| 2004/0219971 A1 | 11/2004 | Ciancio et al. | |
| 2005/0038714 A1 | 2/2005 | Bonet et al. | |
| 2005/0171902 A1 | 8/2005 | Nguyen | |
| 2005/0177493 A1 | 8/2005 | Sung | |
| 2005/0228717 A1 | 10/2005 | Gusler et al. | |
| 2006/0037835 A1 | 2/2006 | Doran et al. | |
| 2006/0190337 A1 | 8/2006 | Ayers et al. | |
| 2006/0190347 A1 | 8/2006 | Cuervo | |
| 2007/0055568 A1 | 3/2007 | Osborne | |
| 2007/0075134 A1 | 4/2007 | Perlow et al. | |
| 2007/0156513 A1 | 7/2007 | Mastrianni et al. | |
| 2007/0205269 A1 | 9/2007 | Lindon | |
| 2007/0272736 A1 | 11/2007 | Brooks et al. | |
| 2007/0284433 A1 | 12/2007 | Domenica et al. | |
| 2008/0027810 A1 | 1/2008 | Lerner et al. | |
| 2008/0162271 A1 | 7/2008 | Benjamin | |
| 2008/0162299 A1 | 7/2008 | Gusler et al. | |
| 2008/0208688 A1 | 8/2008 | Byerley et al. | |
| 2008/0294518 A1 | 11/2008 | Weiss et al. | |
| 2008/0296368 A1 | 12/2008 | Newsom | |
| 2009/0030789 A1 | 1/2009 | Mashinsky | |
| 2009/0074167 A1 | 3/2009 | Evans et al. | |
| 2009/0171773 A1 | 7/2009 | Shastry | |
| 2009/0265269 A1 | 10/2009 | Stoecker | |
| 2009/0283594 A1 | 11/2009 | Walton | |
| 2010/0010888 A1 | 1/2010 | Maertz | |
| 2010/0057580 A1 | 3/2010 | Raghunathan | |
| 2010/0063872 A1 | 3/2010 | Patel | |
| 2010/0070290 A1 | 3/2010 | Marturana et al. | |
| 2010/0076833 A1 | 3/2010 | Nelsen | |
| 2010/0198726 A1 | 8/2010 | Doran et al. | |
| 2010/0280921 A1 | 11/2010 | Stone et al. | |
| 2010/0299194 A1 | 11/2010 | Snyder et al. | |
| 2010/0318415 A1 | 12/2010 | Gottlieb | |
| 2011/0029370 A1 | 2/2011 | Roeding et al. | |
| 2011/0079644 A1 | 4/2011 | Wolfe et al. | |
| 2011/0099104 A1 | 4/2011 | Nybom | |
| 2011/0106698 A1 | 5/2011 | Isaacson et al. | |
| 2011/0178862 A1 | 7/2011 | Daigle | |
| 2011/0178924 A1 | 7/2011 | Briscoe et al. | |
| 2011/0213674 A2 | 9/2011 | Shpun et al. | |
| 2011/0246284 A1 | 10/2011 | Chaikin et al. | |
| 2011/0288978 A1 | 11/2011 | Abifaker | |
| 2011/0295705 A1 | 12/2011 | Kasmei | |
| 2012/0016725 A1 | 1/2012 | Kraft et al. | |
| 2012/0066043 A1 | 3/2012 | Carmichael et al. | |
| 2012/0072298 A1 | 3/2012 | Ramanujam et al. | |
| 2012/0109787 A1 | 5/2012 | Larrick | |
| 2012/0123832 A1 | 5/2012 | Nicolaidis et al. | |
| 2012/0123833 A1 | 5/2012 | Nicolaidis et al. | |
| 2012/0123834 A1 | 5/2012 | Nicolaidis et al. | |
| 2012/0123922 A1 | 5/2012 | Nicolaidis et al. | |
| 2012/0123923 A1 | 5/2012 | Nicolaidis et al. | |
| 2012/0150643 A1 | 6/2012 | Wolfe et al. | |
| 2012/0173402 A1* | 7/2012 | Nicolaidis | G06Q 20/28 |
| | | | 705/37 |
| 2012/0185394 A1* | 7/2012 | Gelfand | G06Q 10/02 |
| | | | 705/44 |
| 2012/0246019 A1 | 9/2012 | Wolfe | |
| 2012/0303425 A1 | 11/2012 | Katzin et al. | |
| 2013/0073388 A1 | 3/2013 | Heath | |
| 2013/0073459 A1 | 3/2013 | Zacarias et al. | |
| 2013/0197986 A1 | 8/2013 | Roberts et al. | |
| 2013/0204681 A1 | 8/2013 | Kraft et al. | |
| 2013/0254074 A1 | 9/2013 | Joa et al. | |
| 2013/0254086 A1 | 9/2013 | Joa et al. | |
| 2013/0268413 A1 | 10/2013 | Burr et al. | |
| 2013/0284805 A1 | 10/2013 | Kraft et al. | |
| 2014/0006129 A1 | 1/2014 | Heath | |
| 2014/0012640 A1 | 1/2014 | Roberts et al. | |
| 2014/0058934 A1 | 2/2014 | Smith et al. | |
| 2014/0081852 A1 | 3/2014 | Blackhurst et al. | |
| 2014/0101044 A1 | 4/2014 | Blackhurst et al. | |
| 2014/0114842 A1 | 4/2014 | Blackhurst et al. | |
| 2014/0229319 A1 | 8/2014 | Roberts et al. | |

OTHER PUBLICATIONS

Swapathing, Inc. Announces the Internet's First Online Gift Card Exchange. Retrieved from http://www.prweb.com/releases/2003/10/prweb83758.htm on Nov. 9, 2011.

Cash for your card now! Retrieved from www.swapagift.com on Nov. 9, 2011.

"What is SwapAGift.com?" retrieved from http://www.swapagift.com/ on Oct. 25, 2011.

Offenberg. "Markets: Gift Cards"; Journal of Economic Perspectives. vol. 21, No. 2, Spring 2007 [Retrieved from the Internet] <URL: http://myweb.lmu.edu/jpate/JEP_2007.pdf>, pp. 227-238.

Ernstberger, Kathryn W., D. McDowell, and J. Parris. "Impact of Closed-Loop Gift Card Promotions by Businesses." International Journal of Business and Social Research 2.6 (2012): 190-197.

(56) References Cited

OTHER PUBLICATIONS

"2010 U.S. Gift Card Consumer Insights Study," dated Mar. 2011, published by First Data Corporation.

* cited by examiner

SYSTEM AND METHOD FOR PURCHASING A PREPAID DEBIT ACCOUNT

PRIORITY CLAIM

The present application is a continuation of U.S. patent application Ser. No. 14/275,948, filed May 13, 2014, is a continuation-in-part of U.S. patent application Ser. No. 13/934,631, filed 3 Jul. 2013, which is a continuation-in-part of U.S. patent application Ser. No. 12/701,711, filed 8 Feb. 2010 (now U.S. Pat. No. 8,500,007, issued Aug. 6, 2013), which is a continuation-in-part of U.S. patent application Ser. No. 12/573,060, filed 2 Oct. 2009 (now U.S. Pat. No. 8,887,998, issued Nov. 18, 2014), the contents of each of which are herein incorporated by reference in their entireties.

BACKGROUND

1. Technical Field

The present disclosure relates to the secondary gift card marketplace and more specifically to reselling gift cards on the secondary market via auctions.

2. Introduction

Gift cards and gift codes are widely used as gifts for birthdays, Christmas, and other holidays. Gift cards and gift codes are closed loop, meaning that the value represented by a gift card or gift code is a valid form of payment at a closed set of retailers. For example, an Outback Steakhouse® gift card/code is only redeemable at Outback Steakhouse® and not at Planet Hollywood® or Target®. Some closed loop cards and codes are valid at a family of closely related or commonly owned merchants. For example, a Darden Restaurants gift card/code is valid at Red Lobster® and Olive Garden®, or a local mall gift card/code is valid at tenant merchants in the local mall. Open loop gift cards (and gift codes), in contrast, are a valid form of payment at virtually every retailer nationwide, such as Visa® or Mastercard® debit cards.

Gift cards/codes are a popular alternative to giving cash or a merchandise item that the recipient may or may not like. However, the recipient may not be able to redeem the gift card/code due to geographic limitations, personal disinterest in the merchant who issued the gift card/code, or other reasons. Additionally, some merchants issue gift cards/codes with significant restrictions, complex fees, and/or an expiration date. According to one estimate, consumers purchase about $80 billion worth of gift cards annually in the U.S. and roughly 10%, or $8 billion, of that amount goes unredeemed. Consumers waste these unredeemed funds and do not benefit from the full value of the gift card/code. Further, if these funds are not spent, they can escheat to the state. Merchants cannot track post-issuance gift card transactions that do not involve the issuing merchant.

Users often sell gift cards on the secondary market, whether directly or through a secondary market broker. Gift cards sold on the secondary market typically sell for a price lower than their face value. For example, a gift card with a value of $100 may sell on the secondary market for $90. On the secondary market, users or brokers often do not know how to price gift cards. Consequently, some gift cards remain on the secondary market for far too long, while others sell quickly, potentially losing profit opportunities.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Some consumers resell or exchange their unwanted or unusable gift cards/codes in what is termed a secondary marketplace. The secondary marketplace is a collection of transactions involving gift cards and/or gift codes which do not involve an original gift card or code issuer. For example, Sears issues a $100 gift card to a Mary. Mary gives the gift card to Larry. Larry uses $50 of the gift card to purchase merchandise from Sears. That use of the gift card is not part of the secondary marketplace because it involves the gift card issuer, Sears. Other transactions that Larry conducts with the remaining balance are part of the secondary market. For example, if Larry sells the $50 balance remaining on the gift card for $35 in cash, that transaction is part of the secondary market. If Larry divides the $50 balance remaining on the gift card into two $25 gift cards, that transaction is part of the secondary market because it does not directly involve the gift card/code issuer.

The merchants who originally issued the gift cards or codes are unable to track this secondary gift card/code market in any meaningful way, potentially leading to lost revenues and marketing opportunities.

The disclosure first discusses an exemplary system and various components thereof that address these issues. The disclosure then turns to a more specific example configuration of how a secondary market for gift codes and gift cards can operate. The disclosure demonstrates an example merchant interface for tracking the secondary market. Finally, the disclosure turns to the exemplary method embodiment.

Figure 1:
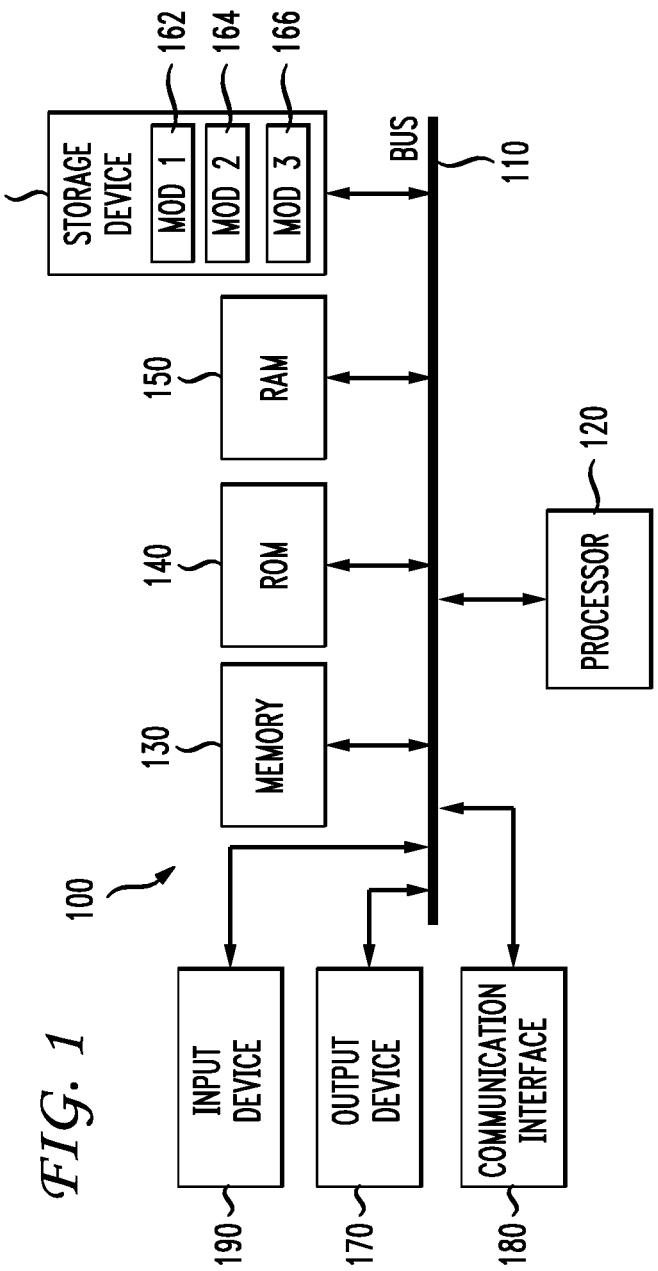
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having discussed some basic system components, the disclosure returns to a discussion of gift cards and codes and tracking the secondary gift card market. Gift cards/codes are divided into open loop and closed loop cards/codes. Typically issuing banks or credit card companies issue open loop cards/codes (example: Visa, MasterCard, Amex or Discover) which can be redeemed by virtually any business entity. These differ from closed loop cards/codes which are typically issued by a specific store or restaurant and can be only redeemed by the issuing provider (example: Sears, Red Lobster, Target). Gift cards/codes are one common form of closed loop cards/codes. The physical card/code and the card/code number associated with the card/code are interchangeable concepts. Gift cards/codes can store a reference to the amount of money within a physical card/code or can store a reference to an external database of accounts which references an amount of money. One or more external database can maintain funds from which each of a set of accounts linked to a card/code can draw. Throughout this disclosure, closed loop cards and other gift cards are interchangeable with a closed loop code or other gift code which serves the same purpose as a physical closed loop card.

Figure 2:
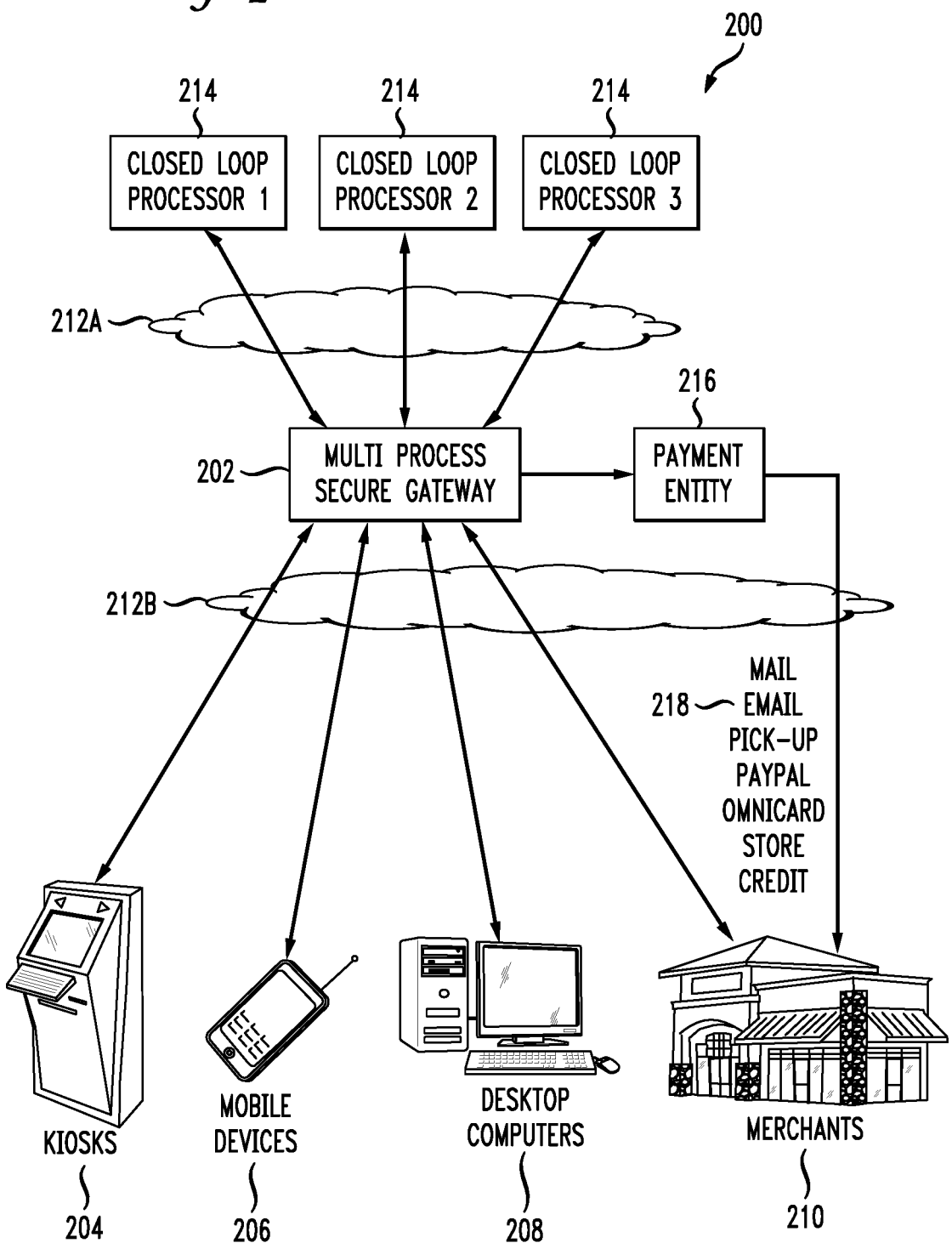
FIG. 2 illustrates an example multi-process secure gateway configuration.

The disclosure now turns to FIG. 2 which illustrates a multi-process secure gateway configuration 200 including a transaction tracker/processor 220. The multi-process secure gateway 202 can be implemented as a local or remote server, a group of tightly or loosely interconnected servers, integrated as a software module within a point of sale device, or as any other suitable device, software, or combination thereof. In FIG. 2, the multi-process secure gateway 202 is shown as a single conceptual server available over a network 212B such as the public telephone network or the Internet. The multi-process secure gateway 202 interacts with various requesters, such as kiosks 204, mobile devices 206, desktop computers 208, and merchants' point of sale devices 210, which submit information uniquely identifying closed loop cards/codes. Mobile device 206 can also represent a standard telephone as well as communication with an interactive voice response system.

Each of these devices can interact with the secure gateway 202 through different protocols, such as a direct network connection, an HTTP-based portal, SMS messages, telephone, interactive voice response systems, point-of-sale (POS) terminals, etc. In the case of merchants, each point of sale of the merchant 210 can connect to a centralized merchant server, not shown, which relays requests to the secure gateway 202 on behalf of all the merchant 210 point of sale devices. Other configurations also exist. In one aspect, this process is called "Cash4Card" (name used for description purposes only). Merchants 210, kiosks 204, other devices and/or locations, including online storefronts, which provide an interface to the secure gateway 202 can provide an easily recognizable visual or other indication readily indicating to potential customers that they accept gift cards/codes under the Cash4Card program. The indication can be a window sticker, an online image, or other sign displayed in a manner similar to the well-known overlapping circles for MasterCard® or the blue and orange bars over and under the word VISA®.

The secure gateway 202 interacts with multiple closed loop processors 214, such as FirstData and Chase Paymentech, over a network 212A such as the Internet. These closed loop processors are entities that process closed loop cards, and are different from a computer processor such as an AMD Phenom II or Intel Core 2 Duo. The secure gateway 202 can perform any action on the closed loop card/code through the various closed loop card/code processors 214 as if the secure gateway 202 was a closed loop merchant. The secure gateway 202 analyzes the submitted information to determine which closed loop processor handles that type of closed loop card/code. For example, a particular series of numbers or letters can indicate that one closed loop card/code is honored by Paymentech, and another distinct set of numbers or letters indicates that another closed loop card/code is honored by FirstData.

The logic and analysis in the secure gateway 202 can change from time to time as new types of cards/codes are issued by existing closed loop processors 214 or as the secure gateway 202 adds interfaces for new closed loop processors. The secure gateway 202 can include a common application programmer interface (API) which defines actions which may be performed through the closed loop processors 214. The API translates API calls to the corresponding specific sets of proprietary interactions with the various closed loop processors 214, which may be very different between closed loop processors 214.

The secure gateway 202 determines the balance of the closed loop card/code from the closed loop processor 214 and offers to purchase the closed loop card/code from the requestor, typically at a price lower than the face value of the card/code (though not always and can be at or above the face value). If the requestor provides an indication of agreement to sell the closed loop card/code, then the secure gateway deactivates the closed loop card/code associated with the submitted information, issues a new closed loop card/code in that amount (which may be a physical closed loop card/code or a virtual closed loop card/code), and pays the purchase price to the requestor through a payment entity 216.

The payment entity 216 can be a merchant that pays the requestor while another entity settles with the merchant. The gateway 202 can also provide instructions to other entities to perform the deactivation, issuance, payment, and other steps. The payment entity 216 can be part of the secure gateway 202, part of a merchant point of sale equipment 210, or a separate entity altogether. The secure gateway 202 can provide additional instructions regarding how to transfer payment 218 to the requestor. Some examples of how to transfer payment include mailing a physical open loop card/code to the requestor, emailing to the requestor the necessary information to use a non-physical open loop card/code (such as an account number and PIN), notifying a local financial service to prepare an amount of money for pickup (such as MoneyGram or Western Union), transferring funds to an electronic account (such as PayPal), transferring money to a requestor's existing open loop card/code (such as an OmniCard or other debit card/code), adding funds to an existing credit card or debit card, any other form of electronic funds transfer (EFT), or granting store credit or any other form of currency usable at a store to the requestor. The payment entity 216 can also provide payment to the requestor using other suitable approaches. Transactions processed through the secure gateway 202 constitute part of the secondary market if they do not directly involve the gift card issuer.

The transaction tracker/processor 220 can receive and/or retrieve information regarding completed, in-process, and/or attempted transactions from the secure gateway 202. The transactions with the secure gateway 202 represent the secondary marketplace for gift cards and gift codes. In the secondary marketplace, non-original issuers of gift cards and codes sell and/or trade the gift cards for cash or for other goods or services. The transaction tracker/processor 220 can be incorporated as part of the secure gateway 202 or can be a separate entity communicating through a network 222 as shown in FIG. 2.

The transaction tracker 220 processes the secondary marketplace transaction information and stores all or part of the processed information in a transaction data repository 224. The transaction tracker 220 can aggregate all or part of the received data, and can categorize data by date, geographical region, type of gift card or code, gift card face value, gift card redemption value, customer habits, whether or not a portion of the gift card had been used, whether a customer is participating in the secondary gift card market for the first time, what the gift card was sold for (i.e. was the gift card exchanged at a merchant, for another gift card, split into smaller denominations, etc.), and so forth. The transaction tracker 220 can provide closed loop processors 214, merchants 210, and/or other interested or involved entities an interface to view, sort, analyze, and otherwise manipulate the stored transaction data 224. In one aspect, a merchant 210 can view detailed information regarding individual transactions associated with gift cards/codes issued by that merchant 210, but only broad statistical data regarding gift cards/codes issued by other merchants.

In one aspect, the transaction tracker 220 provides a web-based user interface. The interface can allow closed loop merchants to compare aggregated statistics to their own statistics. For example, a nationwide office supply retailer can compare the secondary market statistics for their own gift cards to the secondary market of other nationwide office supply retailers to determine trends. The retailer can then exploit these trends with marketing campaigns, in-store promotions, online ads, or other methods.

The transaction tracker 220 can also collect personally identifiable information, such as a phone number, email address, or credit card number associated with each transaction. However, for the sake of privacy, the transaction tracker 220 can strip this information out when providing reports through the interface to the various requesting entities. In one aspect, the transaction tracker 220 offers a user a more favorable price for the gift card on the secondary market in exchange for more detailed personal and/or demographic information. For example, the secure gateway 202 offers a user $34 in cash for a $50 gift card. However, if the user agrees to spend a few minutes to fill out a survey and divulge some more detailed personal information, the transaction tracker 220 can authorize the secure gateway 202 to offer the user $38 in cash instead of $34.

The transaction tracker 220 can also track redemption specific data such as at which specific stores or websites the cards or codes are redeemed. In the case of online redemption, the transaction tracker 220 can track referral websites (i.e. which site referred the customer to the online redemption page). The transaction tracker 220 can disclose all, part, or none of this information to merchants. In one brick and mortar merchant example, if a large number of customers redeem their closed-loop cards and codes at Wal-Mart and Target, the transaction tracker 220 can provide this information to either Wal-Mart or Target so that they can approach issuers of the redeemed cards regarding potential cooperative marketing opportunities.

The transaction tracker 220 can track data indicating which individual store sold each redeemed card or code. Such data allows merchants to identify the origin of redeemed cards. For instance, Best Buy can log into the merchant interface and see data indicating from which specific stores and/or states the secondary market gift card originated. If the data show a large influx of cards redeemed in the secondary marketplace which were issued at Store #1395 in Quakertown, Pa., maybe that is an indication that customers don't like shopping at that store. Best Buy can drill down in to the other data related to these transactions which may shed additional light on the matter.

Additionally, as with virtually any marketplace, one concern is how to detect and prevent fraud in the secondary gift card and gift code marketplace. In one aspect, the transaction tracker 220 tracks and provides information to merchants about fraud related or potentially fraud related trends or individual transactions. For example, if the secure gateway 202 of FIG. 2 processes cards that stolen, the transaction tracker 202 can identify the location, date, time of day, and other information that may be valuable to Merchants. Similarly, some customers attempt to obtain "store credit" via fraud. The transaction tracker 220 can include a fraud alert module that compares transaction information against informational templates which may be indicators of fraud. Alternatively, the transaction tracker 220 can provide the available information to a user without further fraud analysis so that the user can make investigate potential fraud issues.

Figure 3:
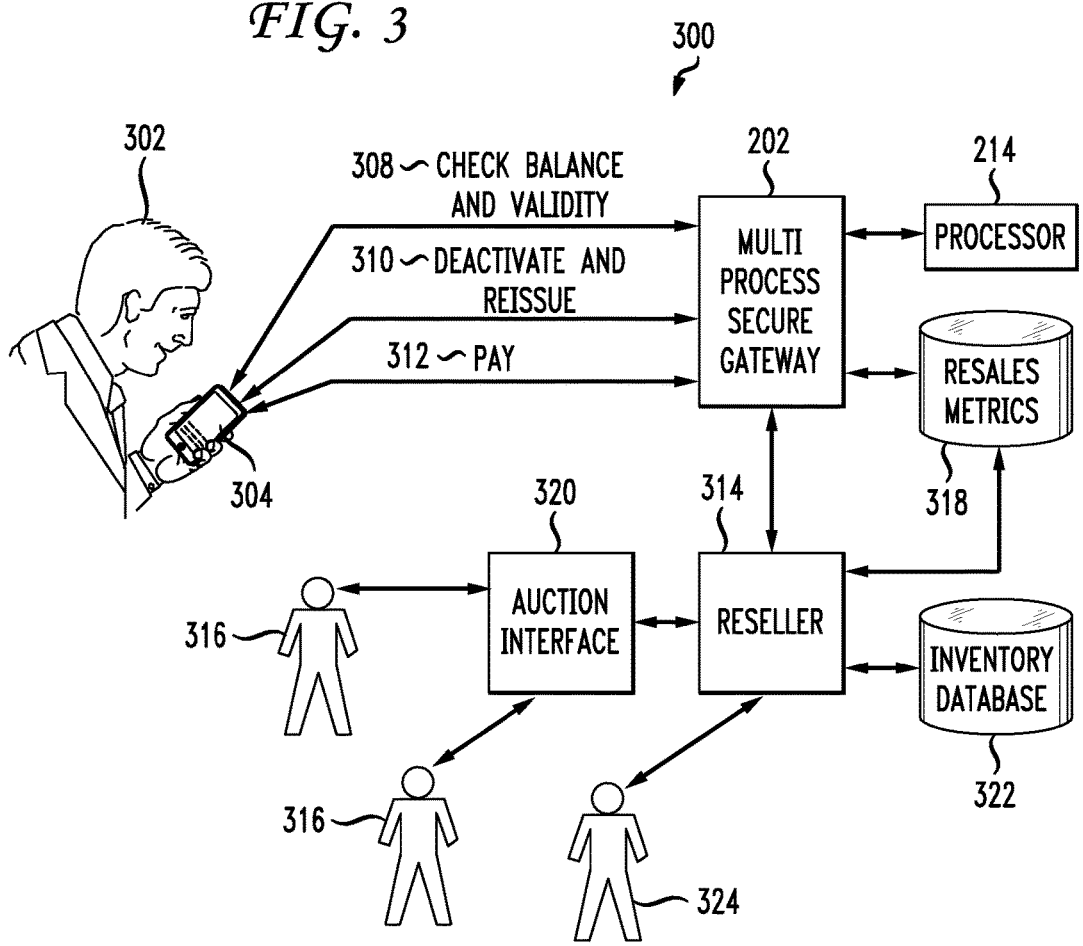
FIG. 3 illustrates user interactions with a secure gateway and a reseller.

FIG. 3 illustrates user interactions with a secure gateway 202 as shown in FIG. 2 and a reseller 314. The user 302, through a network-enabled device 304, transmits a request to the multi-process secure gateway 202 to check the balance and validity of an identified closed loop card 308. As shown in FIG. 2, the secure gateway 202 communicates with the appropriate closed loop processor 214 and returns the balance to the secure gateway 202. The secure gateway 202 makes a purchase price determination based on resales metrics 318 of that particular type of card. Resales metrics can include how fast inventory of a particular type of closed loop card is resold, how much inventory is currently held, desired profit margins, operating expenses, fees to transfer or create new closed loop cards, etc. The secure gateway 202 offers to purchase the closed loop card from the user 302 for the determined purchase price. If the user accepts, the secure gateway deactivates the closed loop card and issues a new closed loop card in the same amount 310. The new closed loop card can be a virtual closed loop card, i.e. numbers stored in a computer-readable storage medium, or an actual printed closed loop card. The secure gateway 202 then pays the user 312 the purchase price or causes another entity (not shown) to make payment to the user as discussed above.

Next, the secure gateway transfers the new closed loop card to a reseller 314. The reseller 314 can offer to sell the new closed loop card for less than its face value. For example, if the user 302 submits a $200 Sears gift card, the secure gateway 202 can examine sales or customer demand data for Sears gift cards in that denomination and offer to purchase the $200 Sears gift card for $135. If the user accepts the offer, the secure gateway 202 pays the user $135. The secure gateway 202 deactivates the $200 Sears gift card and reissues a new $200 Sears gift card, to be stored in the inventory database 322, which can be represented as numbers stored by the reseller 314. The reseller 314 then offers the $200 Sears gift card for sale to the general public 324 at a discount rate of $170, a 15% discount off the face value. When a customer from the general public 324 purchases the $200 Sears gift card, the reseller 314 can convert the virtual gift card to a printed gift card on demand and mail it to the customer. In this case, the reseller profits the difference between the purchase price $135 and the discount rate $170, or $35. The reseller 314 can operate as a brick and mortar retail store, an online storefront, an online auction, or any other suitable sales outlet. In another aspect, the reseller 314 purchases a gift card from a user at or above its face value, i.e. purchases a $100 Sears gift card for $100 or for $110. In this case, the reseller 314 can make a profit by providing the payment for the gift card on a general-purpose reloadable card run by the reseller. Then the reseller 314 can make profit by interest, float, interchange, and/or monthly minimum fees.

In one embodiment, the reseller 314 uses an auction interface 320 to sell gift cards. The reseller 314 can offer gift cards through the auction interface 320 on a consignment model, so that the reseller 314 offers for auction cards that are not yet owned by the reseller 314, but which users have offered for sale. The auction interface 320 can offer the Sears gift card from the example above at an initial price of $200, or at a price slightly below the face value such as $195. Then, if no one has purchased the gift card at that price after a specified duration, the auction interface 320 reduces the price of the gift card by some increment. If the gift card started at $200, and the increment is $10, then the auction interface 320 changes the price to $190. If a user purchases the gift card via the auction interface, the reseller 314 can complete the transaction, receive payment, and transfer the gift card or its equivalent to the purchaser. If no one buys the gift card, the auction interface 320 can continue, at regular intervals, to reduce the price by the increment, until the price goes below a minimum threshold, or a floor price. Then, instead of reducing the price further, the reseller 314 purchases the gift card for the floor price, and stores the gift card in the inventory database 322. Then, the reseller 314 can offer the gift card for sale at some other price, most likely at a price somewhere between the floor price for which the gift card was purchased and the face value.

Figure 4:
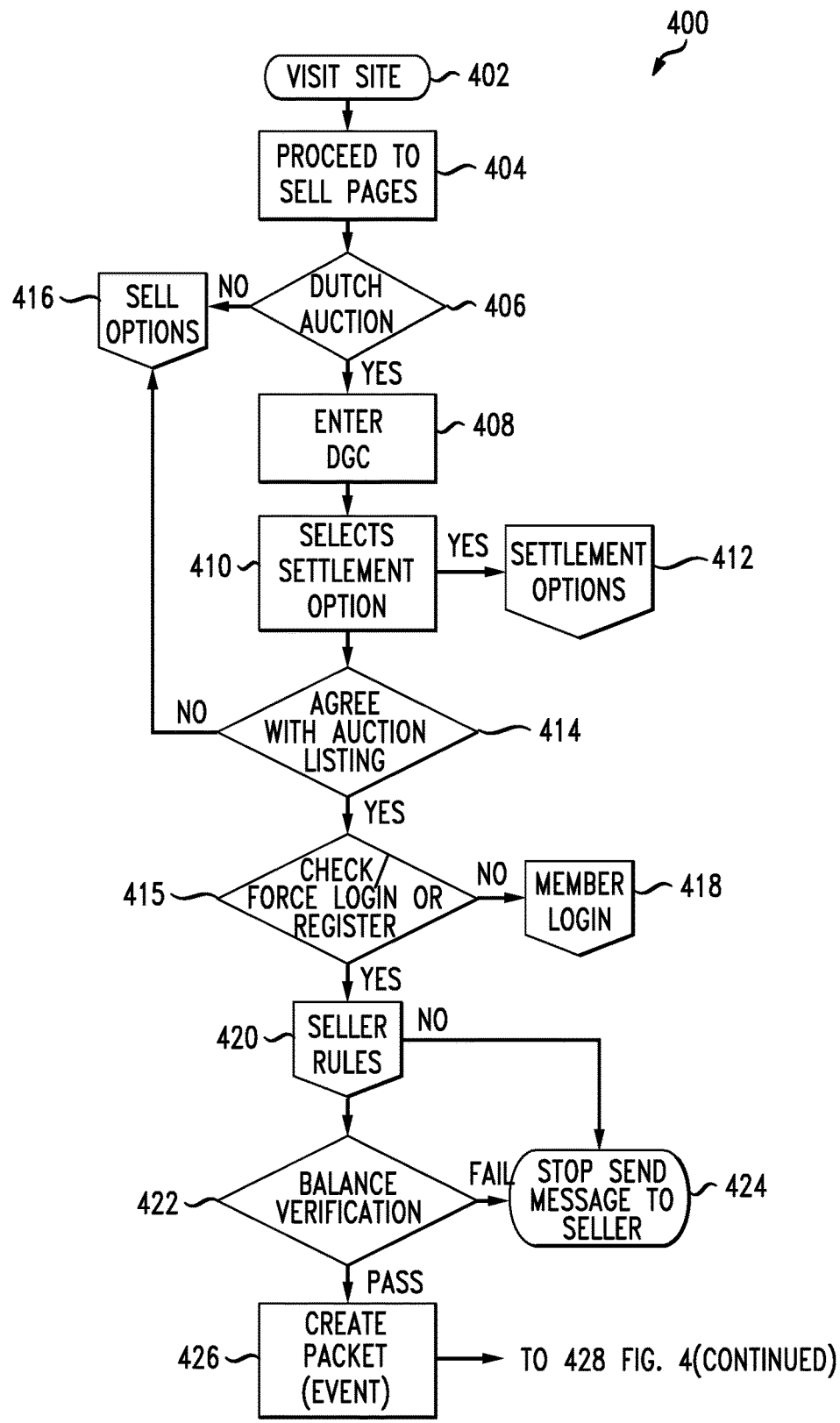
FIG. 4 illustrates an example workflow for the auction interface.
Figure 4:
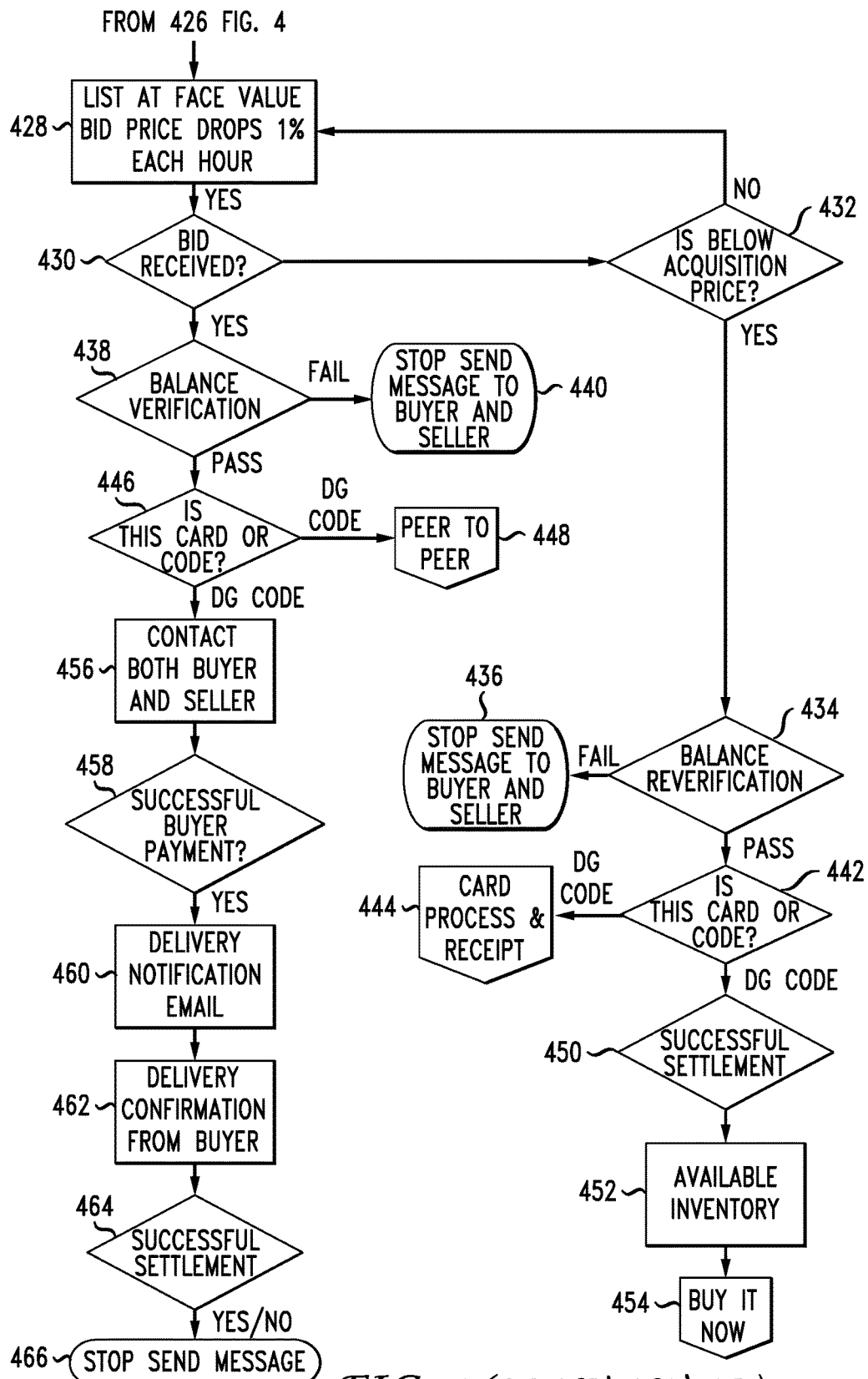

FIG. 4 illustrates an example workflow 400 for the auction interface 320. The workflow is discussed in terms of a web-based interface, but all or part of this workflow 400 can be adapted for a mobile device or other computing or human interface platform, such as a desktop software application or a server based software application with a voice interface accessible via telephone. In this example workflow 400, a user visits a website 402 of a reseller of gift cards in the secondary market, and proceeds to a sell page 404. The user has a choice 406 whether or not to sell a gift card via a Dutch auction. If the user selects no, then the system can present other selling options 416, such as selling the card to the reseller at a percentage of the face value. If the user chooses to sell the gift card via a Dutch auction, the user navigates to a discount gift card (DGC) Dutch auction portal 408, where the user can view settlement options 410 or modify settlement options 412 for the Dutch auction, such as how the user wishes to be paid. Then, if the user agrees 414 with the auction listing, the user can continue on. If the user does not agree with the auction listing, the user can return to the other selling options 416 and select a different way to sell the gift card. Then the system can check 415 if the user has logged in, and, if not, present a member login 418 page or an account creation page. Then, the user can progress to the seller rules 420, where the system can present default rules for the sale, or the user can specify rules, such as a starting price, conditions on the sale, and so forth. At this point, or at some earlier stage in the process, the system can verify the balance 422 of the gift card to be sold via the Dutch auction. If the system fails to verify the balance, the system can stop the processor 424 and send a message to the user that the balance was not verified or can present other details so the user knows how to correct or investigate the problem. Once the gift card balance is verified, the system can create a packet 426 identifying the gift card and parameters for the gift card, payment, or sale of the gift card via the Dutch auction.

Then, the Dutch auction portal offers the gift card for sale. Initially, the Dutch auction portal can list the gift card in the packet at face value (or some other value below face value), and the bid price drops by some percentage or some fixed amount at time intervals 428. For example, the gift card can be listed in the Dutch auction at the full face value, and reduced by 1% each hour, or can be listed at $1 less than the face value and decremented by $0.50 each day. Then, if the system receives a bid 430 from a buyer for the gift card at the auction price, the system can again verify the balance 438 of the gift card. If the verification fails, the system can stop the auction 440 and send notifications to both the buyer and the seller. However, if the balance is verified 438, then the system determines whether this auction is selling a card or a code 446. If the discounted gift is a gift card, the system can initiate a peer to peer 448 contact so the user can make arrangements for delivering the gift card to the buyer. In one embodiment, the reseller can receive the gift card from the seller, and hold it or have an escrow or consignment agent hold the gift card until the buyer purchases the gift card.

If the discount gift is a gift code, rather than a physical gift card for example, the system can contact both the buyer and the seller 456 to notify them of the sale. Then, pending a successful payment from the buyer 458, the system can send a delivery notification email 460 to the buyer that either contains the gift code or provides instructions for obtaining the gift code. When the system confirms delivery to the buyer 462 and provides trackable delivery data to the buyer, the system considers the transaction complete, and registers a successful settlement 464 of the gift card auction to stop 466 the auction.

If the Dutch auction proceeds without bids, the system repeatedly decrements or reduces the gift card price until the price meets or is below a floor or acquisition price 432. When the price meets or is below the acquisition price, then the system can take the gift card out of the Dutch auction, and verify the balance 434. If the system fails to verify the balance, such as the balance has changed or decreased, then the system can send a message 436 to the seller of the gift card. If the system successfully verifies the balance, the system can confirm whether the gift card is a physical card or a gift code 442. If it is a gift card, the system can initiate a card delivery and receipt process 444 for the seller to send the gift card to the reseller. If it is a gift code, then the system can process a successful settlement 450 by transferring the code into available inventory 452 and offering the gift code for purchase at a "Buy It Now" price 454. In one embodiment, the seller sends the gift card or gift code to the reseller in advance of the Dutch auction, and the reseller simply retains the card or code in escrow until a successful sale via the Dutch auction or purchase at the acquisition price, at which time the reseller or the buyer pays the seller the corresponding purchase price.

Figure 5:
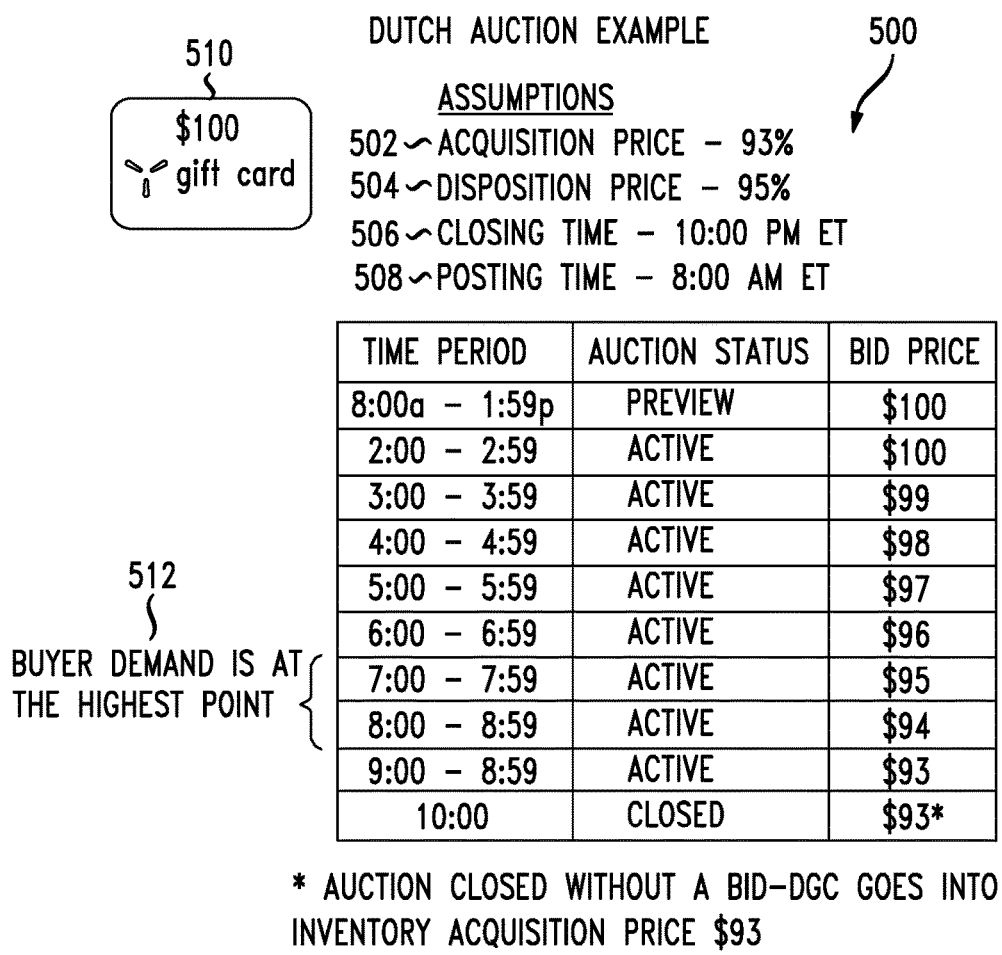
FIG. 5 illustrates an example Dutch auction.

FIG. 5 illustrates an example Dutch auction 500 for demonstrating the process for auctioning discounted gift cards or discounted gift codes (DGCs). A seller visits a reseller website and chooses the Dutch Auction format to sell unwanted DGCs. The seller can choose to list an individual DGC or a group of DGCs for sale as an auction lot. In this example, the auction lot is a single $100 gift card 510. The seller or the reseller website can establish various conditions or terms for the auction lot. In this example, the auction conditions include an acquisition price of 93% 502, a disposition price of 95% 504, a closing time of 10:00 pm Eastern Time 506, and a posting time of 8:00 am Eastern Time 508. In this example, from 8:00 am to 1:59 pm, the auction lot is in a preview status and is listed at the full face value of $100. In preview status, potential buyers can examine the lot, but may not place bids. Then, starting at 2:00 pm, the system transitions the auction lot from preview status to active status, at which time buyers can buy the lot at the listed price. At some interval, every hour in this example, the system reduces the price by some amount. The amount can be fixed or can be determined based on some other factor, such as the number of viewers, how long they are viewing the lot, how many similar lots are available at that time, current demand for similar lots, and so forth. The system can reduce the price by a dollar amount or a percentage of the face value of the gift card 510. In this example, the interval is every hour, and the decrement amount is $1 or 1%.

At any time throughout the auction, a buyer can accept the bid price and purchase the lot. Then the system can deliver the DGC in the lot to the buyer, or winning bidder. The system can deliver electronic gift codes by providing access to a code, image, or printable code via a secure computer, mobile device, kiosk, or other interface. The system can arrange for physical delivery, either from the seller of the DGC or from the reseller, depending on where the DGC is located and which party has possession of the DGC. In one embodiment, the system deactivates the seller's DGC, and issues a new DGC in the same denomination for shipping to the buyer.

The system can vary the duration of the Dutch auction based on various factors, such as the number of bid price drops determined by the difference between the verified face value and the predetermined bid price, or based on a fixed time interval for each drop in bid price. In one embodiment, the system can suggest parameters to maximize the sale price. For example, the system can suggest a starting and closing time so that a particular price point coincides with a high point in demand 512 to maximize the chances of a sale at a higher price point. The system can adjust the maximum auction duration by modifying the interval time or the decrement amount. The preview period for an auction lot can be optional. The system can dynamically determine the acquisition price 502 for an individual DGC based on internal and external market conditions, such as competitor pricing, current inventory levels, the face value of the gift card, specific merchant characteristics, and so forth. If the price reaches the acquisition price 502 without a bid, the system can purchase the lot and take the DGCs in the lot into inventory for resale at the disposition price 504.

Figure 6:
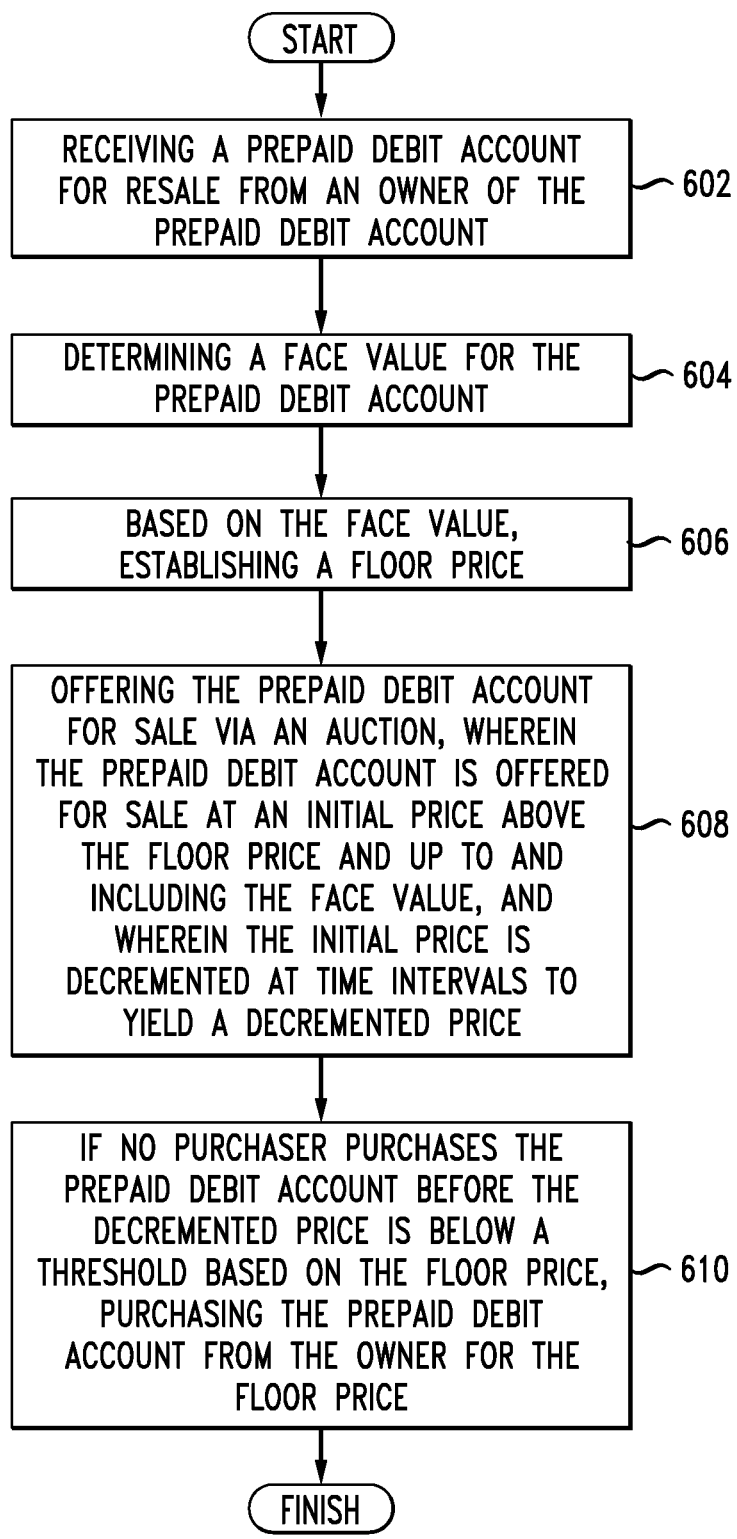
FIG. 6 illustrates an example method embodiment for auctioning gift cards on the secondary market.

Having disclosed system components and concepts, the disclosure now turns to the exemplary method embodiment for auctioning gift cards on the secondary market, as shown in FIG. 6. For the sake of clarity, the method is discussed in terms of an example system such as is shown in FIG. 1 configured to practice the method. The example system can perform the steps in the order shown or some other order, and can further perform additional steps or exclude certain steps.

The system can receive a prepaid debit account for resale from an owner of the prepaid debit account (602). The prepaid debit account can be associated with a physical or virtual gift card, a gift certificate, an electronic gift card, or a gift code, for example. The prepaid debit account can be closed loop or open loop, or can be open loop with one or more restrictions placed thereon. The system can determine a face value for the prepaid debit account (604). For example, the system can query an entity holding or administering the prepaid debit account to electronically verify the face value or the current balance of the prepaid debit account. Based on the face value, the system can establish a floor price (606). The system can further establish other auction parameters for the sale of the prepaid debit account. Once at least a minimum set of auction parameters are established, the system can present a preview of the action to the owner for approval prior to activating the auction.

The system can offer the prepaid debit account for sale via an auction, wherein the prepaid debit account is offered for sale at an initial price above the floor price and up to and including the face value, and wherein the initial price is decremented at time intervals to yield a decremented price (608). The system can set an end time for the auction, based on a desired price target, input from the owner, the face value of the prepaid debit account, a decrement value, a size of the time intervals, an urgency score, a target sale price, or historical bidding data. The system can establish the size of the time intervals based on a difference between the face value and the floor price. The auction can include multiple prepaid debit accounts as a single auction lot. The system can "lock" the prepaid debit account during the auction so the prepaid debit account cannot be used for transactions while locked. This can reduce the chance of a user listing a prepaid debit account for auction, but using the prepaid debit account to make purchases in the interim either inadvertently, or in hopes that the reseller or the eventual purchaser will not find out, or will not be able to track down the seller.

The system can end the auction when a purchaser purchases the prepaid debit account at the decremented price above the floor price. However, if no purchaser purchases the prepaid debit account before the decremented price is below a threshold based on the floor price, the system can purchase the prepaid debit account from the owner for the floor price (610). The system can store the prepaid debit account in an inventory after purchasing the prepaid debit account, and can offer the prepaid debit account for sale at a resale price above the floor price and below the face value.

Embodiments within the scope of the present disclosure may also include tangible and/or non-transitory computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving a prepaid debit account for sale from an owner of the prepaid debit account;
determining, via a processor, a face value for the prepaid debit account;
based on the face value, establishing a floor price;
offering the prepaid debit account for sale via an auction, wherein the prepaid debit account is offered for sale at an initial price above the floor price and up to and including the face value, and wherein the initial price is decremented at time intervals to yield a decremented price; and
if no purchaser purchases the prepaid debit account before the decremented price is below a threshold based on the floor price, purchasing the prepaid debit account from the owner for the floor price.

2. The method of claim 1, wherein the prepaid debit account is associated with one of a physical gift card, a virtual gift card, a gift certificate, an electronic gift card and a gift code.

3. The method of claim 1, where the prepaid debit account is one of an open loop account and a closed loop account.

4. The method of claim 1, wherein determining the face value for the prepaid debit account comprises querying an administrator regarding the prepaid debit account.

5. The method of claim 1, further comprising:
establishing an auction parameter associated with the auction.

6. The method of claim 1, further comprising:
establishing a minimum set of auction parameters; and
presenting a preview to the owner of the prepaid debit account prior to offering the prepaid debit account for sale via the auction.

7. A system comprising:
a processor; and
a computer-readable computer medium storing instructions which, when executed by the processor, cause the processor to perform operations comprising:
receiving a prepaid debit account for sale from an owner of the prepaid debit account;
determining a face value for the prepaid debit account;
based on the face value, establishing a floor price;
offering the prepaid debit account for sale via an auction, wherein the prepaid debit account is offered for sale at an initial price above the floor price and up to and including the face value, and wherein the initial price is decremented at time intervals to yield a decremented price; and
if no purchaser purchases the prepaid debit account before the decremented price is below a threshold based on the floor price, purchasing the prepaid debit account from the owner for the floor price.

8. The system of claim 7, wherein the prepaid debit account is associated with one of a physical gift card, a virtual gift card, a gift certificate, an electronic gift card and a gift code.

9. The system of claim 7, where the prepaid debit account is one of an open loop account and a closed loop account.

10. The system of claim 7, wherein determining the face value for the prepaid debit account comprises querying an administrator of the prepaid debit account.

11. The system of claim 7, wherein the computer-readable computer medium stores additional instructions which, when executed by the processor, cause the processor to perform operations comprising:
establishing at least one auction parameter associated with the auction.

12. The system of claim 7, wherein the computer-readable computer medium stores additional instructions which, when executed by the processor, cause the processor to perform operations comprising:
establishing a minimum set of auction parameters; and
presenting a preview to the owner of the prepaid debit account prior to offering the prepaid debit account for sale via the auction.

13. A computer-readable computer storage device storing additional instructions which, when executed by processor, cause the processor to perform operations comprising:
receiving a prepaid debit account for sale from an owner of the prepaid debit account;
determining a face value for the prepaid debit account;
based on the face value, establishing a floor price;
offering the prepaid debit account for sale via an auction, wherein the prepaid debit account is offered for sale at an initial price above the floor price and up to and including the face value, and wherein the initial price is decremented at time intervals to yield a decremented price; and
if no purchaser purchases the prepaid debit account before the decremented price is below a threshold based on the floor price, purchasing the prepaid debit account from the owner for the floor price.

14. The computer-readable computer storage device of claim 13, wherein the prepaid debit account is associated with one of a physical gift card, a virtual gift card, a gift certificate, an electronic gift card and a gift code.

15. The computer-readable computer storage device of claim 13, where the prepaid debit account is one of an open loop account and a closed loop account.

16. The computer-readable computer storage device of claim 13, wherein determining the face value for the prepaid debit account comprises querying an administrator of the prepaid debit account.

17. The computer-readable computer storage device of claim 13, wherein the computer-readable computer storage device stores additional instructions which, when executed by the processor, cause the processor to perform operations comprising:
establishing at least one auction parameter associated with the auction.

18. The computer-readable computer storage device of claim 13, wherein the computer-readable computer storage device stores additional instructions which, when executed by the processor, cause the processor to perform operations comprising:
establishing a minimum set of auction parameters; and presenting a preview to the owner of the prepaid debit account prior to offering the prepaid debit account for sale via the auction.

\* \* \* \* \*